United States Patent
Efendiyev et al.

(10) Patent No.: US 10,754,972 B2
(45) Date of Patent: Aug. 25, 2020

(54) MULTI-FACTOR ADMINISTRATOR ACTION VERIFICATION SYSTEM

(71) Applicant: salesforce.com, inc., San Francisco, CA (US)

(72) Inventors: Arastun Efendiyev, Framingham, MA (US); Daniel Thomas Harrison, Newmarket (CA); Jeffrey DiMuro, Milford, CT (US)

(73) Assignee: salesforce.com, inc., San Francisco, CA (US)

( * ) Notice: Subject to any disclaimer, the term of this patent is extended or adjusted under 35 U.S.C. 154(b) by 60 days.

(21) Appl. No.: 15/884,146

(22) Filed: Jan. 30, 2018

(65) Prior Publication Data

US 2019/0236297 A1 Aug. 1, 2019

(51) Int. Cl.
| | |
|---|---|
| G06F 21/62 | (2013.01) |
| H04L 29/06 | (2006.01) |
| G06F 16/958 | (2019.01) |
| H04L 29/08 | (2006.01) |
| H04L 9/08 | (2006.01) |
| G06F 16/27 | (2019.01) |

(52) U.S. Cl.
CPC ........ G06F 21/6218 (2013.01); G06F 16/972 (2019.01); H04L 63/08 (2013.01); H04L 63/105 (2013.01); H04L 63/108 (2013.01); G06F 16/27 (2019.01); H04L 9/0891 (2013.01); H04L 67/10 (2013.01); H04L 2463/082 (2013.01)

(58) Field of Classification Search
CPC ..... H04L 63/08; H04L 63/105; H04L 63/108; H04L 9/0891; H04L 67/10; H04L 2463/082
See application file for complete search history.

(56) References Cited

U.S. PATENT DOCUMENTS

| | | |
|---|---|---|
| 6,119,101 A | 9/2000 | Peckover |
| 6,286,002 B1 | 9/2001 | Axaopoulos et al. |
| 7,319,976 B1 | 1/2008 | Peckover |
| 7,567,936 B1 | 7/2009 | Peckover et al. |
| 7,865,404 B2 | 1/2011 | Peckover |
| 8,001,047 B2 | 8/2011 | Peckover et al. |

(Continued)

OTHER PUBLICATIONS

Identity Validation, salesforce.com, inc., https://help.salesforce.com/articleView?id=mc_overview_identity_verification.htm&type=5, 1 page. [Retrieved Jan. 25, 2018].

*Primary Examiner* — Alexander Lagor
*Assistant Examiner* — William B Jones
(74) *Attorney, Agent, or Firm* — Kowert, Hood, Munyon, Rankin & Goetzel, P.C.

(57) ABSTRACT

In various embodiments, a method of verifying a multi-factor administrator action may be performed. The method may include receiving, from a first user, an authentication request that indicates a requested access, where the first user has administrative privileges to perform the requested access. The method may further include identifying a second user that has administrative privileges to approve the requested access. A verification request may be to the second user. In response to receiving an approval message from the second user within a particular amount of time, an authentication response that indicates that the first user is authorized to perform the requested access may be sent to the first user.

19 Claims, 5 Drawing Sheets

(56) References Cited

U.S. PATENT DOCUMENTS

| | | |
|---|---|---|
| 8,037,512 B2 | 10/2011 | Wright et al. |
| 8,250,225 B1 | 8/2012 | Eubanks et al. |
| 8,560,396 B2 | 10/2013 | Peckover |
| 9,009,805 B1 * | 4/2015 | Kirkby .............. G08B 13/19684 726/7 |
| 2005/0027617 A1 | 2/2005 | Zucker et al. |
| 2005/0027618 A1 | 2/2005 | Zucker et al. |
| 2005/0033659 A1 | 2/2005 | Zucker et al. |
| 2005/0114218 A1 | 5/2005 | Zucker et al. |
| 2006/0041752 A1 | 2/2006 | Tuvell et al. |
| 2008/0320561 A1 | 12/2008 | Suit et al. |
| 2009/0217358 A1 * | 8/2009 | Kumar ................ H04L 63/0272 726/5 |
| 2012/0047560 A1 | 2/2012 | Underwood et al. |
| 2013/0159021 A1 | 6/2013 | Felsher |
| 2013/0282589 A1 | 10/2013 | Shoup et al. |
| 2015/0378716 A1 * | 12/2015 | Singh ...................... H04W 4/60 717/172 |
| 2017/0118025 A1 * | 4/2017 | Shastri .................... G06F 21/32 |

* cited by examiner

MULTI-FACTOR ADMINISTRATOR ACTION VERIFICATION SYSTEM

BACKGROUND

Some database systems allow a user having a certain privilege level to make changes. However, these changes can result in unintended consequences. For example, the user can accidentally or maliciously delete or modify data, making information stored by the database systems difficult or impossible to recover.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "processing element configured to verify access permissions" is intended to cover, for example, an element that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a computer system that includes six data objects, the terms "first data object" and "second data object" can be used to refer to any two of the six data objects, and not, for example, just logical data objects zero and one.

When used in the claims, the term "or" is used as an inclusive or and not as an exclusive or. For example, the phrase "at least one of x, y, or z" means any one of x, y, and z, as well as any combination thereof (e.g., x and y, but not z).

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

A multi-factor administrator action verification system is described herein where a first user with administrative privileges to perform a requested access attempts to perform the requested access. For example, the first user may attempt to modify or delete an encryption key for a data file. A second user may be identified, based on the requested access, to approve the requested access. In some embodiments, the second user may have administrative privileges to approve the requested access. In response to receiving an approval message from the second user within a particular amount of time (e.g., five minutes or three hours), the user may be authorized to perform the requested access. However, in some cases, if the approval message is not received within the particular amount of time or if the second user indicates the user is not authorized to perform the requested access, the user may be prevented from performing the requested access. In some embodiments, if the second user did not respond within the particular amount of time, at least one additional user having administrative privileges to approve the requested access may be identified to approve the requested access.

Additionally, in some embodiments, the second user may have administrative privileges to perform the requested access and the first user may have administrative privileges to approve the requested access. In response to the second user attempting to perform the requested access, the first user may be identified to approve the requested access. Accordingly, the multi-factor administrator action verification system may prevent unilateral action by a user, even though the user has administrative privileges to perform the requested access. As a result, in some cases, a risk of error or malicious intent with regard to sensitive actions may be reduced.

As described herein, the term "administrative privileges" is intended to be interpreted in accordance with its ordinary meaning in the art, which is distinct from the concept of a "user level privilege" to refer to a set of permissions with regard to a specified action or data object. In some particular cases, "administrative privileges" may refer to a highest level of privileges available within a system that is over and above a user level privilege. For example, an administrative user with administrative privileges with regard to a data file would have permissions to read, modify, and delete the data file. As another example, an administrative user with administrative privileges with regard to a computer system would have permissions to access the computer system and read, create, modify, and delete data stored by the computer system. In some cases, an administrative user may be a network administrator or an IT professional.

Figure 1:
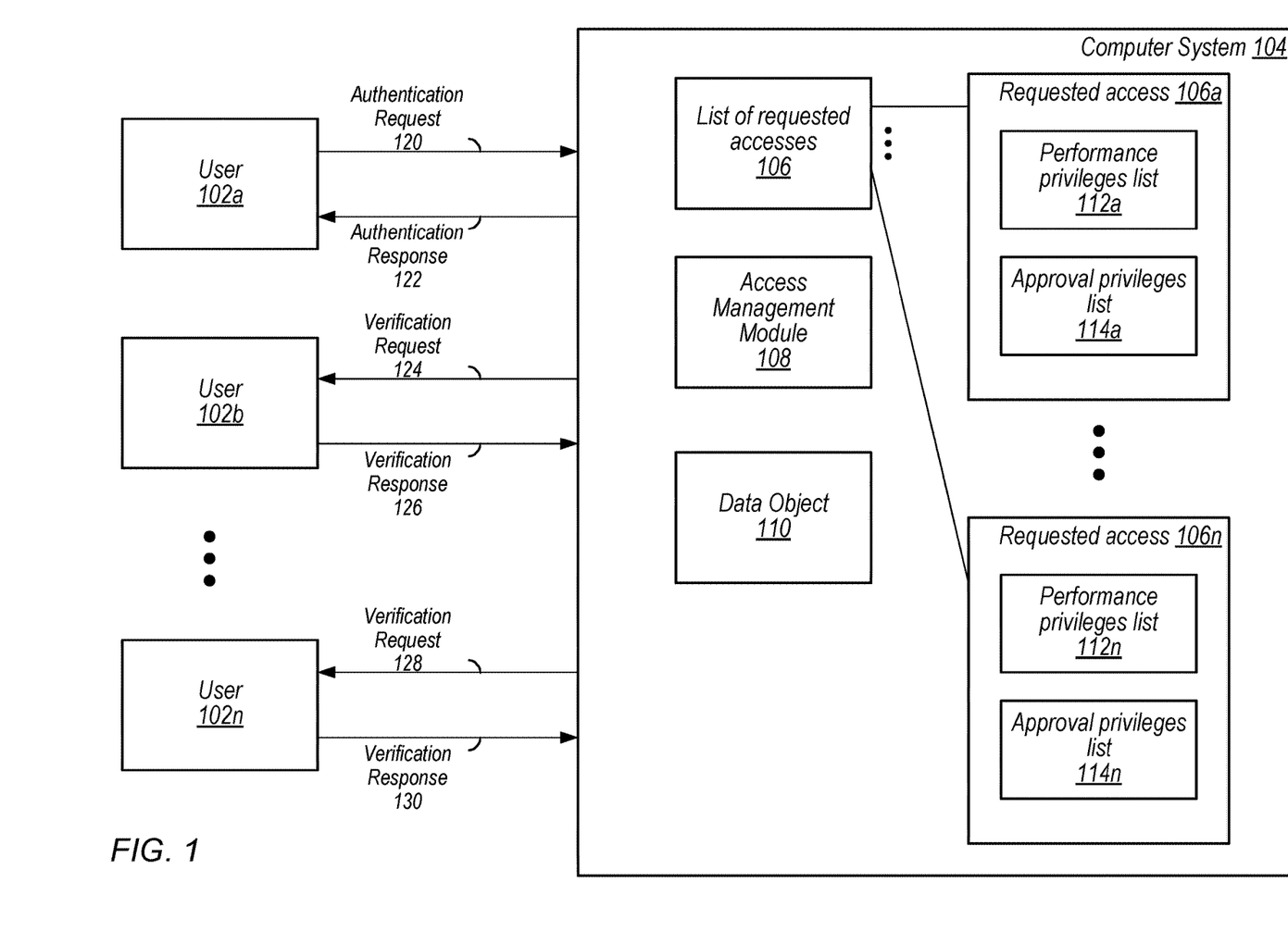
FIG. 1 is a block diagram illustrating an exemplary multi-factor verification system, according to some embodiments.

This disclosure initially describes, with reference to FIG. 1, various embodiments of an exemplary multi-factor administrator action verification system and an exemplary response to an exemplary access request. Methods of responding to an access request are described with reference to FIGS. 2 and 3. An exemplary multi-tenant database system is described with reference to FIG. 4. Finally, an embodiment of a computing system that includes a multi-factor administrator action verification system is described with reference to FIG. 5.

Turning now to FIG. 1, a multi-factor administrator action verification system is shown. In the illustrated embodiment, the system includes users 102*a-n* and computer system 104. Computer system 104 includes list of requested accesses 106, access management module 108, and data object 110. Entries of list of requested accesses 106 include, in the illustrated embodiment, performance privileges list 112 and approval privileges list 114. In various embodiments, various portions of the illustrated system may not be present, may be combined, or may be separated into various devices. For example, in some embodiments, performance privileges list 112 and approval privileges list 114 may be the same for some or all requested accesses 106*a-n*. As another example, in some embodiments, data object 110 or list of requested accesses 106 may be stored in another computing device (e.g., a storage device external to computer system 104). As one more example, in some embodiments, access management module 108 may include or otherwise be combined with list of requested accesses 106.

Users 102*a-n* may request, via corresponding authentication requests, various requested accesses. For example, in the illustrated embodiment, user 102*a* sends authentication request 120 to computer system 104. Authentication request 120 includes an indication of a requested access. For example, the requested access may be a request to modify a particular quantity of data (e.g., data of data object 110) or an action that prevents another user from accessing a data file such as modifying an encryption key (e.g., an encryption key used to decrypt data object 110). As another example, the requested access may be a request to access a system during a particular time period (e.g., access files outside of normal business hours). User 102*a* may have administrative privileges to perform the requested access. However, as discussed above, because of the nature of the requested access (e.g., the requested access affects administrative access to sensitive data), computer system 104 may perform additional verification. In some cases, authentication request 120 may provide additional context comments regarding the requested access (e.g., reasons why user 102*a* is requesting to perform the requested access). Additionally, in some cases, authentication request 120 may identify one or more users (e.g., user 102*b*, user 102*n*, or both) for approval of the requested access.

Computer system 104 may receive authentication request 120. Access management module 108 may determine whether authentication request includes an indication of a requested access. Additionally, access management module 108 may determine whether the user has administrative privileges to perform the requested access. For example, authentication request 120 may include one or more indications that user 102*a* has administrative privileges to perform the requested access. As another example, the requested access may correspond to an entry of list of requested accesses 106 (e.g., requested access 106*a*). Access management module 108 may determine, based on a corresponding performance privileges list, whether the requesting user is authorized to perform the requested access. For example, access management module 108 may determine that user 102*a* is listed by performance privileges list 112*a*. In some embodiments, if computer system 104 determines that user 102*a* does not have administrative privileges to perform the requested access, the requested access may be denied via authentication response 122. Additionally, in some cases, if the requested access does not indicate that the requested access should be verified, if user 102*a* has performance privileges, the requested access may be approved via authentication response 122.

In some cases, requested access 106*a* may indicate that the requested access should be verified (e.g., authenticated). Accordingly, computer system 104 may identify at least one user other than the requesting user (user 102*a*) authorized to approve (e.g., authenticate) the requested access. In the illustrated embodiment, the users authorized to approve the access are listed by the corresponding approval privileges list (e.g., approval privileges list 114*a*). However, in other embodiments, performance privileges list 112*a* and approval privileges list 114*a* may be a single list (e.g., a list of users with privileges to perform and approve the requested access). In some embodiments, performance privileges list 112, approval privileges list 114, or both may correspond to users having a particular position (e.g., manager) within an organization. Additionally, in some cases, multiple requested accesses (e.g., requested access 106*a* and requested access 106*n*) may share a single performance privileges list, approval privileges list, or both. In some cases, the requesting user (e.g., user 102*a*) may indicate one or more users to approve the requested access.

Accordingly, in the illustrated example, in response to authentication request 120, computer system 104 may send verification request 124 to user 102*b*. User 102*b* may indicate, via verification response 126, that the requested access is approved or denied. In response to verification response 126, computer system 104 may indicate, via authentication response 122, that the requested access is approved or denied. Additionally, in some cases, verification response 126 may provide context regarding the approval or denial, such as reasons why the requested access was denied or a particular period of time during which the user is authorized to perform the requested access. If a response is not received from user 102*b* within a particular amount of time (e.g., five minutes or three hours), computer system 104 may perform various actions which may depend on the requested access. In particular, computer system 104 may automatically approve the requested access, may automatically deny the requested access, or may automatically send a verification response to another user having administrative privileges to approve the requested access. Subsequently, user 102*a* may perform the requested access (e.g., modifying an encryption key used to encrypt data object 110).

In some embodiments, computer system 104 may send verification requests to one or more other users (e.g., verification request 128 to user 102*n*). In some cases, a requested access may only be approved if a particular number (e.g., three) users with administrative approval privileges approve the requested access. Alternatively, as noted above, computer system 104 may send a verification request 128 to user 102*n* if a response (e.g., verification response 126) is not received from user 102*b* within a particular amount of time (e.g., five minutes or three hours). Verification response 130 may be received from user 102*n*. In some embodiments, the particular amount of time may vary based on the requested access (e.g., different requested accesses may correspond to different amounts of time). In some embodiments, prior to sending verification request 124 to user 102*b*, computer system 104 may indicate to user 102*a* that authentication request 120 includes a requested access associated with the verification process described above. In some embodiments, in response to the indication, user 102*a* may specify one or more users to verify the request.

In some embodiments, prior to accepting authentication request 120 or in response to receiving authentication request 120, computer system 104 may determine an identity of user 102*a* (e.g., to verify that user 102*a* has permission to request authentication request 120). In various embodiments, this process may involve, for example, a login procedure such as having the user enter a password or a personal identification number. Similarly, prior to sending verification request 124, subsequent to sending verification request 124, or in response to receiving verification response 126, computer system 104 may determine an identity of user 102*b* (e.g., to verify that user 102*b* has permission to authenticate or verify authentication request 120).

In some embodiments, an authentication tool may be used for communications between users 102*a-n* and computer system 104. For example, the tool may authenticate the access of user 102*a* in the computer system 104. Further the tool may identify whether user 102*a* is authorized to perform the requested access. Additionally, the tool may identify whether user 102*b* is authorized to verify the requested access. As one example, the tool may identify that the user is authorized to perform the requested access based on receiving a personal identification number generated by an authentication device. A similar system may be used to identify whether user 102*b* is authorized to verify the requested access.

As noted above, in some embodiments, administrative privileges may be related to a position within an organization. However, in some embodiments, the users 102*a-n* may have varying positions relative to each other. For example, in the illustrated embodiment, user 102*a* may be a supervisor of user 102*b*. However, the requested access may still indicate that approval should be given to potentially reduce the chances that a mistake or malicious action negatively affects access to data objects corresponding to the requested access, such as, in the illustrated embodiment, data object 110.

Figure 2:
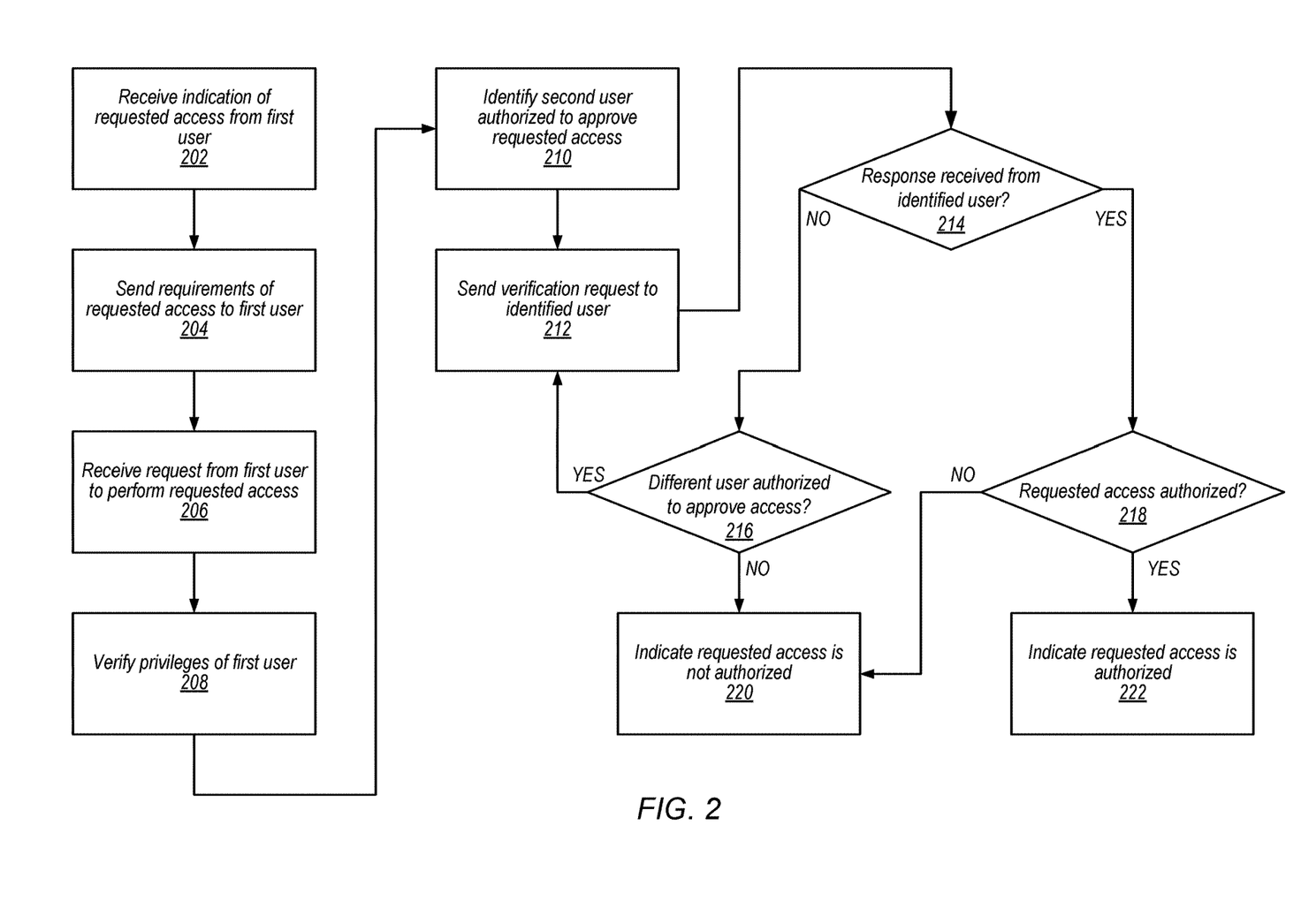
FIG. 2 is a flow diagram illustrating a first embodiment of a method of verifying a requested access.

Referring now to FIG. 2, a flow diagram of a method of verifying a requested access is depicted. In some embodiments, the method may be initiated or performed by one or more processors in response to one or more instructions stored by a computer-readable storage medium. In various embodiments, as discussed above, various portions of the method may be omitted (e.g., blocks 204 and 206 may be omitted), combined, or may be performed in a different order.

At 202, the method includes receiving an indication of a requested access from a first user. For example, computer system 104 of FIG. 1 may receive authentication request 120 from user 102*a*. At 204, the method includes sending requirements of the requested access to the first user. For example, computer system 104 may indicate to user 102*a* that authentication request 120 includes a requested access indicated as involving verification.

At 206, the method includes receiving a request from the user to perform the requested access. For example, computer system 104 may receive from user 102*a* a request to proceed with the requested access of authentication request 120. At 208, the method includes verifying the privileges of the first user. For example, computer system 104 may determine that user 102*a* is included in performance privileges list 112*a*, which, in this example, corresponds to the requested access.

At 210, the method includes identifying a second user authorized to approve the requested access. For example, computer system 104 may identify one or more users (e.g., user 102*b*) from approval privileges list 114*a*. As another example, computer system 104 may receive from user 102*a* an indication of one or more users authorized to approve the requested access. At 212, the method includes sending a verification request to the identified user. For example, computer system 104 may send verification request 124 to user 102*b*.

As discussed above, in some embodiments, a response may not be received within a particular amount of time. At 214, if a response is not received from the identified user within the particular amount of time, the method proceeds to 216. For example, verification response 126 may not be received from user 102*b* within an amount of time associated with the requested access (e.g., three hours). As discussed above, in some embodiments, multiple users may be authorized to approve the requested access. At 216, if a different user is authorized to approve the access, a verification request is sent to the different user at 212. For example, user 102*n* may be identified to approve the requested access and verification request 128 may be sent to user 102*n*. If no different users are authorized to approve the requested access, the method proceeds to 220.

At 214, if a response is received from the identified user within the particular amount of time, the method proceeds to 216. For example, verification response 126 may be received from user 102*b*. At 218, if the requested access is authorized, the method proceeds to 222. If the requested access is not authorized, the method proceeds to 220.

At 220, an indication is sent to the user that the requested access is not authorized. For example, authentication response 122 may indicate that the requested access is not authorized. At 222, an indication is sent to the user that the requested access is authorized. For example, authentication response 122 may indicate that the requested access is authorized. Accordingly, a method of verifying a requested access is depicted.

Figure 3:
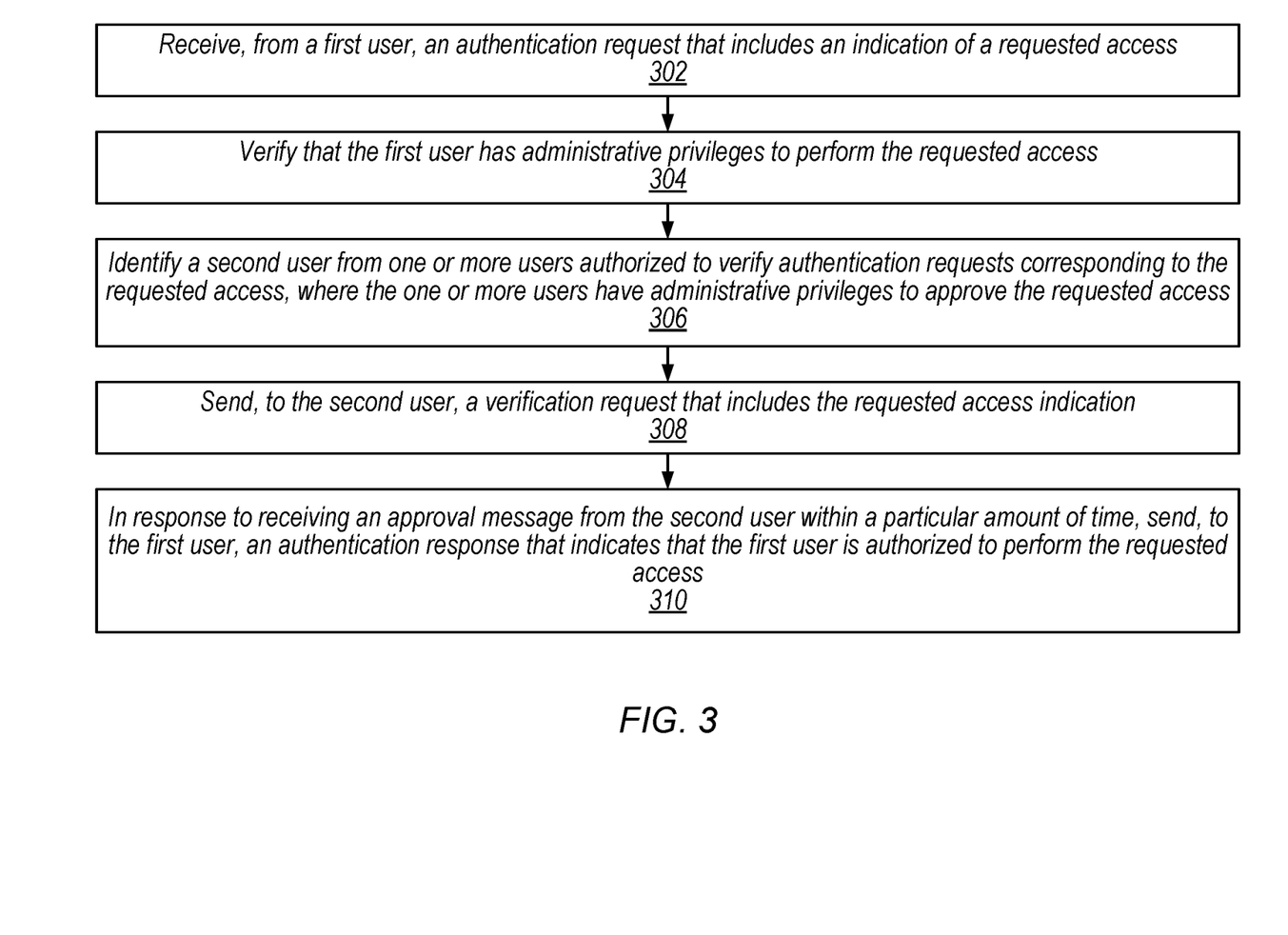
FIG. 3 is a flow diagram illustrating a second embodiment of a method of verifying a requested access.

Referring now to FIG. 3, a flow diagram of a method of verifying a requested access is depicted. In some embodiments, the method may be initiated or performed by one or more processors in response to one or more instructions stored by a computer-readable storage medium. In various embodiments, as discussed above, various portions of the method may be omitted (e.g., blocks 304 may be omitted), combined, or may be performed in a different order.

At 302, the method includes receiving, from a first user, an authentication request that includes an indication of a requested access. For example, computer system 104 of FIG. 1 may receive authentication request 120 from user 102a. At 304, the method includes verifying that the first user has administrative privileges to perform the requested access. For example, computer system 104 may determine that user 102a is included in performance privileges list 112a, which, in this example, corresponds to the requested access.

At 306, the method includes identifying a second user from one or more users authorized to verify authentication requests corresponding to the requested access. The one or more users have administrative privileges to approve the requested access. For example, computer system 104 may identify one or more users (e.g., user 102b) from approval privileges list 114a. As another example, computer system 104 may receive from user 102a an indication of one or more users authorized to approve the requested access. At 308, the method includes sending, to the second user, a verification request that includes the requested access indication. For example, computer system 104 may send verification request 124 to user 102b.

At 310, the method includes, in response to receiving an approval message from the second user within a particular amount of time, sending, to the first user, an authentication response that indicates that the first user is authorized to perform the requested access. For example, authentication response 122 may be sent to user 102a, indicating that the requested access is authorized. Accordingly, a method of verifying a requested access is depicted.

Figure 4:
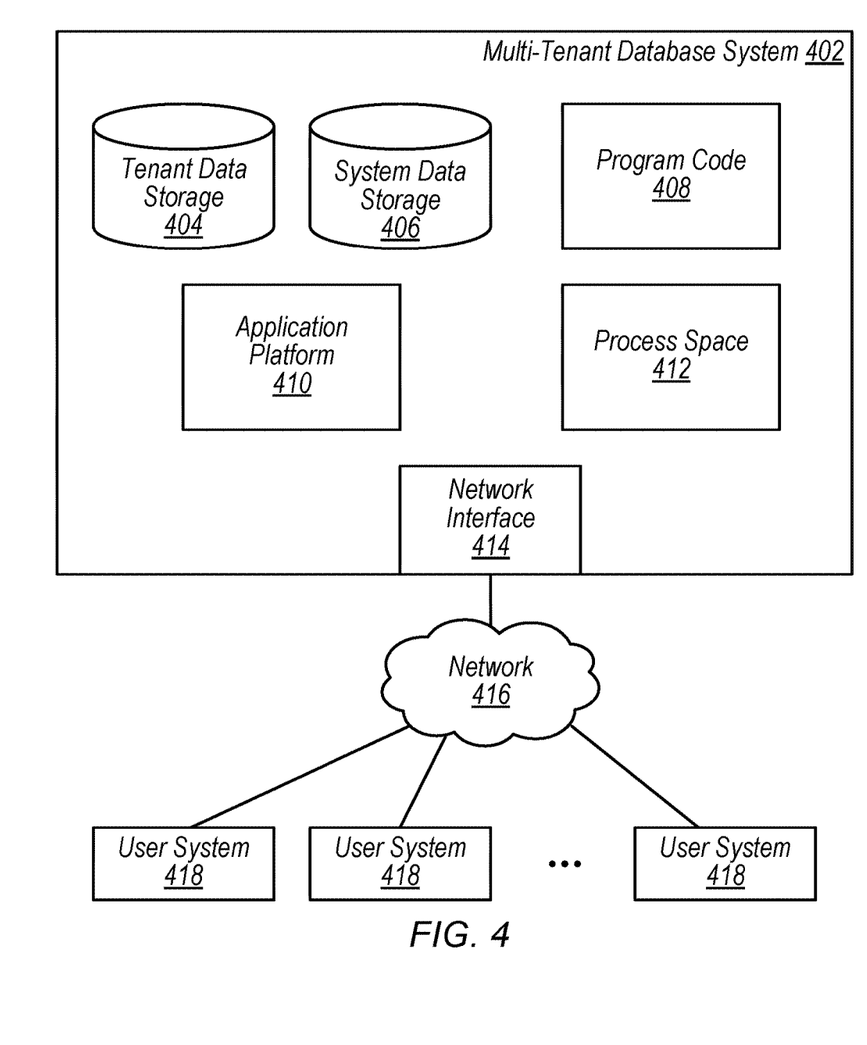
FIG. 4 is a block diagram illustrating an exemplary multi-tenant database system, according to some embodiments.

FIG. 4 illustrates an exemplary environment in which a multi-factor administrator action verification system may be implemented. Note that the disclosed multi-tenant systems are included to illustrative purposes but are not intended to limit the scope of the present disclosure. In other embodiments, similar techniques may be implemented in non-multi-tenant environments such as various client/server environments, cloud computing environments, clustered computers, etc. One or more users (e.g., via user systems 418), may interact with a multi-tenant database system (MTS) 402 via a network 416. MTS 402 may store information from one or more tenants stored into tables of a common database image. A database image may include one or more database objects. A relational database management system (RDMS), object oriented database management system (OODBMS) or the like may execute storage and retrieval of information against the database object(s). MTS 402 may include an application platform 410 that enables creation, managing and executing one or more applications developed by the provider of MTS 402, users accessing the MTS 402 via user system 418, or third party application developers accessing MTS 402 via user system 418. In some embodiments, MTS 402 may be a network-based computing platform.

The users of user systems 418 may be users in differing capacities and the capacity of a particular user system 418 might be determined one or more permission levels associated with the current user. For example, when a salesperson is using a particular user system 418 to interact with MTS 402, that user system 418 may have capacities (e.g., user privileges) allotted to that salesperson. However, when an administrator is using the same user system 418 to interact with MTS 402, the user system 418 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. Additionally, as discussed above, some actions, such as actions modifying access to various data objects, may be subject to multi-user multi-factor authentication as described above. Accordingly, in some embodiments, MTS 402 may include portions of or all of computer system 104 of FIG. 1, discussed above.

Network 416 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the disclosed embodiments may utilize any of various other types of networks.

User systems 418 may communicate with MTS 402 using TCP/IP and, at a higher network level, use other common Internet protocols to communicate, such as HTTP, FTP, AFS, WAP, etc. As an example, where HTTP is used, user system 418 might include an HTTP client commonly referred to as a "browser" for sending and receiving HTTP messages from an HTTP server at MTS 402. Such a server might be implemented as the sole network interface between MTS 402 and network 416, but other techniques might be used as well or instead. In some implementations, the interface between MTS 402 and network 416 includes load sharing functionality, such as round-robin HTTP request distributors to balance loads and distribute incoming HTTP requests evenly over a plurality of servers. In some cases, each of the plurality of servers has access to data stored on the MTS 402, at least for the users that are accessing a server.

In some embodiments, the system shown in FIG. 4 implements a web-based customer relationship management (CRM) system. For example, in some embodiments, MTS 402 includes application servers configured to implement and execute CRM software applications as well as provide related data, code, forms, web pages and other information to and from user systems 418 and to store to, and retrieve from, a database system related data, objects and web page content. In embodiments of a multi-tenant system, tenant data may be arranged such that data of one tenant is kept separate from that of other tenants so that that one tenant does not have access to another tenant's data, unless such data is expressly shared. In various embodiments, MTS 402 implements applications other than, or in addition to, a CRM application. For example, MTS 402 may provide user systems 418 access to multiple hosted (standard and/or custom) applications, including a CRM application. User (or third party developer) applications, which may or may not include CRM, may be supported by the application platform 410. In particular, application platform 410 may manage creation of the applications, testing of the applications, storage of the applications into one or more database objects, execution of the applications in a virtual machine of process space 412, or any combination thereof.

One arrangement of elements of MTS 402 is shown in FIG. 4, including application platform 410, network interface 414, storage 404 for tenant data, storage 406 for system data accessible to MTS 402 and possibly multiple tenants, program code 408 for implementing various functions of MTS 402, and a process space 412 for executing MTS system processes and tenant-specific processes, such as running applications as part of an application service. In some embodiments, data stored in tenant data storage 404, system data storage 406, or both may be associated with requested accesses involving verification.

Several elements in the system shown in FIG. 4 may include conventional, well-known elements that need not be explained in detail here. For example, each user system 418 may be a desktop personal computer, workstation, laptop, PDA, cell phone, or any Wireless Access Protocol (WAP) enabled device or any other computing device capable of interfacing directly or indirectly to the Internet or other network connection. In some cases, user system 418 may include dedicated hardware configured to interface with MTS 402 over network 416. User system 418 may execute an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 418 to access, process, and view information and pages available to it from MTS 402 over network 416. Each user system 418 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 402 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user system 418 and its components are operator configurable using applications, such as a browser, that include computer code executable on one or more processing elements. Similarly, in some embodiments, MTS 402 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

According to some embodiments, each MTS 402 is configured to provide web pages, forms, applications, data, and/or media content to user systems 418 to support the access by user systems 418 as tenants of MTS 402. As such, in this embodiment, MTS 402 provides security mechanisms, such as encryption, to keep each tenant's data separate unless the data is shared. If more than one server is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 5:
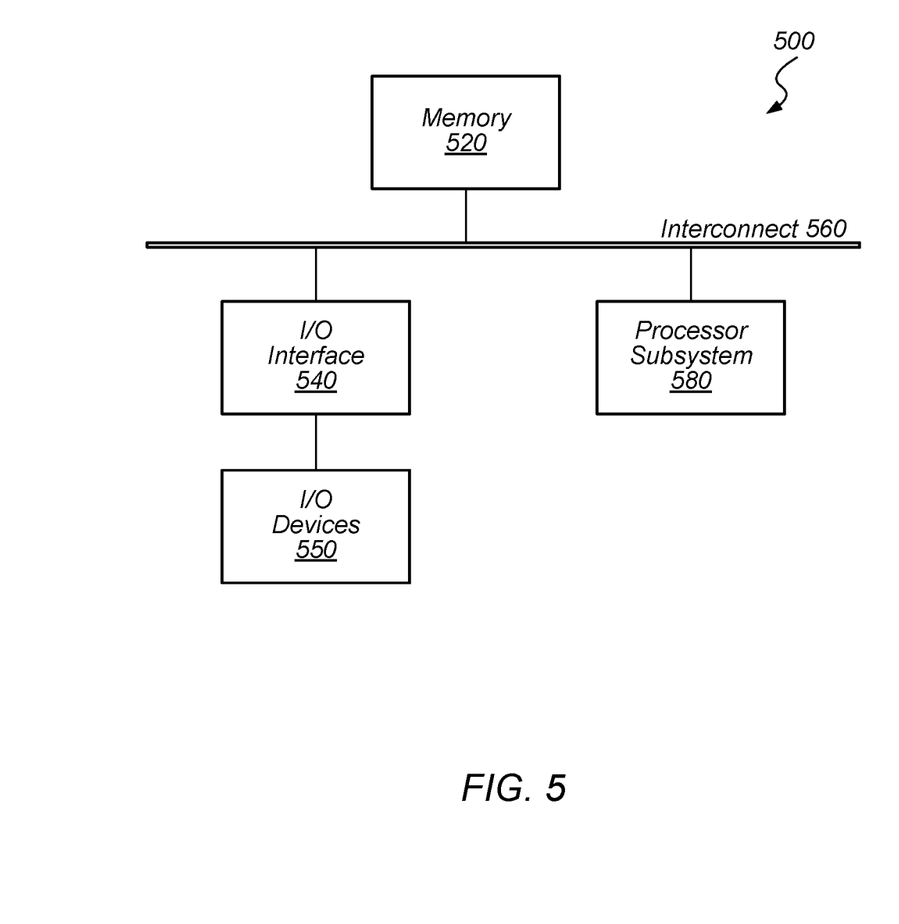
FIG. 5 is a block diagram illustrating an embodiment of a computing system that includes at least a portion of a multi-factor verification system.

Turning now to FIG. 5, a block diagram of an exemplary computer system 500, which may correspond to a portion of or all of computer system 104, is depicted. Computer system 500 includes a processor subsystem 580 that is coupled to a system memory 520 and I/O interfaces(s) 540 via an interconnect 560 (e.g., a system bus). I/O interface(s) 540 is coupled to one or more I/O devices 550. Computer system 500 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 500 is shown in FIG. 5 for convenience, computer system 500 may also be implemented as two or more computer systems operating together.

Processor subsystem 580 may include one or more processors or processing units. In various embodiments of computer system 500, multiple instances of processor subsystem 580 may be coupled to interconnect 560. In various embodiments, processor subsystem 580 (or each processor unit within 580) may contain a cache or other form of on-board memory.

System memory 520 is usable store program instructions executable by processor subsystem 580 to cause computer system 500 perform various operations described herein. System memory 520 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 500 is not limited to primary storage such as system memory 520. Rather, computer system 500 may also include other forms of storage such as cache memory in processor subsystem 580 and secondary storage on I/O Devices 550 (e.g., a hard drive, storage array, etc.). In some embodiments, these other forms of storage may also store program instructions executable by processor subsystem 580. In various embodiments, data stored by or data, that when executed by a processor, causes the processor to perform operations described above with reference to FIGS. 1-4, or any combination thereof described above may be included within system memory 520.

I/O interfaces 540 may be any of various types of interfaces configured to couple to and communicate with other devices, according to various embodiments. In one embodiment, I/O interface 540 is a bridge chip (e.g., Southbridge) from a front-side to one or more back-side buses. I/O interfaces 540 may be coupled to one or more I/O devices 550 via one or more corresponding buses or other interfaces. Examples of I/O devices 550 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 500 is coupled to a network via a network interface device (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

Various operations described herein may be implemented by a computing device configured to execute program instructions that specify the operations. Similarly, various operations may be performed by circuitry desired or configured to perform the operations. In some embodiments, a non-transitory computer-readable medium has program instructions stored thereon that are capable of causing various operations described herein. As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable storage medium having computer instructions stored thereon that, when executed by a computer system, cause operations comprising:
   receiving, from a first administrative user, an authentication request that includes an indication of a requested access, wherein the first administrative user has administrative privileges to perform the requested access;
   in response to receiving the authentication request, identifying a second administrative user from a plurality of other administrative users authorized to verify authentication requests corresponding to the requested access, wherein the plurality of other administrative users have administrative privileges to approve the requested access;
   sending, to the second administrative user, a verification request that includes the requested access indication;
   in response to determining that an approval message from the administrative user has not been received within a particular amount of time, sending, to a third of the plurality of other administrative users, another verification request that includes the requested access indication; and
   in response to receiving an approval message from the third administrative user, sending, to the first administrative user, an authentication response that indicates that the first administrative user is authorized to perform the requested access.

2. The non-transitory computer-readable storage medium of claim 1, wherein the requested access includes modifying an encryption key.

3. The non-transitory computer-readable storage medium of claim 1, wherein the requested access includes modifying at least a particular quantity of data included in a database system.

4. The non-transitory computer-readable storage medium of claim 1, wherein the first administrative user is authorized to verify authentication requests from other users.

5. The non-transitory computer-readable storage medium of claim 4, wherein the operations further comprise:
   in response to receiving, from the second administrative user, a second authentication request that includes a second indication of the requested access, identifying the first administrative user;
   sending, to the first administrative user, a second verification request that includes the second requested access indication; and
   in response to receiving a second approval message from the first administrative user within the particular amount of time, sending, to the second administrative user, a second authentication response that indicates that the second administrative user is authorized to perform the requested access.

6. The non-transitory computer-readable storage medium of claim 1, wherein the requested access includes an action that prevents the second administrative user from accessing a data file.

7. The non-transitory computer-readable storage medium of claim 1, wherein the identifying includes selecting the second administrative user from a list of administrative users that have administrative privileges to approve the requested access.

8. The non-transitory computer-readable storage medium of claim 1, wherein the particular amount of time varies based on the requested access.

9. The non-transitory computer-readable storage medium of claim 1, wherein the authentication request includes an indication of the second administrative user.

10. The non-transitory computer-readable storage medium of claim 1, wherein the verification request further includes a context comment from the first administrative user regarding the requested access.

11. The non-transitory computer-readable storage medium of claim 1, wherein sending the authentication response includes sending an indication of a particular period of time during which the first administrative user is authorized to perform the requested access.

12. A method, comprising:
receiving, by a computer system from a first user, an authentication request that includes
an indication of a requested access;
verifying, by the computer system, that the first user has administrative privileges to perform the requested access;
identifying, by the computer system, a second user from a plurality of users authorized to verify authentication requests corresponding to the requested access, wherein the plurality of users have administrative privileges to approve the requested access;
sending, by the computer system to the second user, a verification request that includes the requested access indication;
in response to determining that an approval message from the second user has not been received within a particular amount of time, sending, to a third of the plurality of users, another verification request that includes the requested access indication; and
in response to receiving an approval message from the third user, sending, by the computer system to the first user, an authentication response that indicates that the first user is authorized to perform the requested access.

13. The method of claim 12, wherein the first user is a supervisor of the second user.

14. The method of claim 12, wherein the particular amount of time is based on the requested access.

15. The method of claim 12, wherein the requested access includes updating a data object included in a database.

16. A computer system, comprising:
one or more processors; and
memory having program instructions stored therein that are executable by the one or more processors to cause the computer system to perform operations including:
receiving, from a first user, an authentication request that includes an indication of a requested access, wherein the first user has administrative privileges to perform the requested access;
identifying a second user from a list of users authorized to verify authentication requests corresponding to the requested access, wherein the users of the list of users have administrative privileges to perform the requested access, and wherein the list of users includes the first user;
sending, to the second user, a verification request that includes the requested access indication;
in response to determining that an approval message from the second user has not been received within a particular amount of time, sending, to a third user in the list, another verification request that includes the requested access indication; and
in response to receiving an approval message from the third user, sending, to the first user, an authentication response that indicates that the first user is authorized to perform the requested access.

17. The computer system of claim 16, wherein the operations further comprise verifying that the first user has the administrative privileges to perform the requested access.

18. The computer system of claim 16, wherein the particular amount of time is determined based on the requested access.

19. The computer system of claim 16, wherein the operations further comprise identifying the list from a plurality of lists corresponding to a plurality of respective requested accesses.

* * * * *